United States Patent

[11] 3,615,837

[72] Inventor Morton Beltzer
 New York, N.Y.
[21] Appl. No. 717,952
[22] Filed Apr. 1, 1968
[45] Patented Oct. 26, 1971
[73] Assignee Esso Research and Engineering Company

[54] ALKALI METAL DIHYDROGEN PHOSPHATE MELT ELECTROLYTES
3 Claims, No Drawings

[52] U.S. Cl. .................................................. 136/86, 136/153
[51] Int. Cl. .................................................. H01m11/00, H01m 27/00
[50] Field of Search ........................................ 136/86, 153, 154

[56] References Cited
UNITED STATES PATENTS

| | | | |
|---|---|---|---|
| 3,026,364 | 3/1962 | Jackson et al. | 136/153 X |
| 3,120,456 | 2/1964 | Broers | 136/153 X |
| 3,351,491 | 11/1967 | Harris et al. | 136/153 X |
| 2,901,524 | 8/1959 | Gorin et al. | 136/86 |
| 3,441,443 | 4/1969 | Beltzer et al. | 136/154 |

FOREIGN PATENTS

| | | | |
|---|---|---|---|
| 1,050,091 | 12/1966 | Great Britain | 136/153 |

*Primary Examiner*—Donald L. Walton
*Attorneys*—Pearlman and Stahl and Robert I. Pearlman ABSTRACT: Due to its scarcity and expense as compared with its activity, noble metals have become less desirable as fuel cell catalysts. As a result, nonnoble metals have found increasing use in fuel cell operations. Satisfactory performance of such cells, however, can only be obtained when they are operated at relatively high temperatures of 200° C. to 300° C. One problem encountered at these high temperatures is that art-known electrolytes become too corrosive, necessitating the use of other electrolyte systems. Satisfactory electrolytes can be made from several alkali metal dihydrogen phosphates as the initial components. A particularly desirable electrolyte consists of a melt of potassium dihydrogen phosphate and sodium dihydrogen phosphate.

ALKALI METAL DIHYDROGEN PHOSPHATE MELT ELECTROLYTES

BACKGROUND OF THE INVENTION

1. Field of the Invention

This invention pertains to electrolytes used in fuel cell systems. More particularly, it is concerned with a fuel cell, designed for operation at temperatures between about 200° to 300° C., which contains an electrolyte made from alkali metal dihydrogen phosphates. A particularly desirable electrolyte system is made from a mixture of potassium dihydrogen phosphate and sodium dihydrogen phosphate.

2. Description of the Prior Art

Fuel cells for the direct production of electrical energy from hydrogen and carbonaceous fuels have been known to the art. The term "fuel cell" is used herein to refer to a device, apparatus or system wherein hydrogen or a fluid organic compound of a lower oxidation state than carbon dioxide is oxidized electrochemically with resulting net production of electrical energy. Such cells ordinarily comprise at least one fuel electrode and at least one oxygen electrode, either an electrolyte extending from a fuel electrode to an oxygen electrode or an anolyte in contact with a fuel electrode and in ion exchange with a catholyte in contact with an oxygen electrode, means for passing a fluid fuel into dual contact with electrolyte and fuel electrode, means for passing oxidizing gas into dual contact with electrolyte and oxygen electrode and means for recovering electrical energy generating in such cell.

In the art noble metals have been used as catalysts in the electrodes of the cell. These catalysts serve to promote the necessary reaction for the production of electrical energy. One problem associated with such metals is that they are very expensive and are in short supply. Other catalyst systems have been investigated and certain nonnoble metals have been found to be a favorable alternative. As a general rule, however, these nonnoble metal catalysts, such as nickel and nickel-cobalt alloy are not as active at ambient temperatures as are the noble metals. Accordingly, to increase catalytic activity, the temperature at which the cell operates must be raised to temperatures of about 200° to 300° C. At these temperatures, however, another problem arises. Acidic electrolytes such as sulfuric and phosphoric acid, which are well known in the art, become extremely corrosive and destroy the electrodes within very short periods of time. Therefore, it is necessary that an electrolyte be developed which will have the necessary properties of a fuel cell electrolyte and yet be essentially noncorrosive to other fuel cell components at these temperatures.

SUMMARY OF THE INVENTION

It has now been found that molten electrolytes made from alkali metal dihydrogen phosphates as the starting materials possess the properties required of fuel cell electrolytes. Thus these systems, which are also referred to as melts of alkali metal dihydrogen phosphates, are invariant (i.e. $CO_2$ rejecting), chemically and electrochemically stable and ionically conductive. These systems also minimize concentration polarization by their buffering action and exhibit minimal corrosiveness when employed in fuel cells operating at temperatures of between about 200° to 300° C.

It has been found that, although the molten salt or melt derived from $KH_2PO_4$ satisfactorily performs the function of an electrolyte, it may be improved by the addition of molten sodium or lithium dihydrogen phosphate or combinations thereof, preferably sodium dihydrogen phosphate. The end result would be a melt of potassium dihydrogen phosphate and an alkali metal dihydrogen phosphate other than potassium dihydrogen phosphate. The amount of sodium or lithium dihydrogen phosphate starting component present in a melt containing potassium dihydrogen phosphate as the other starting component can range from a very minor amount up to a weight ratio of 1:1. Preferably, the weight ratio of the potassium dihydrogen phosphate to the sodium or lithium dihydrogen phosphate is in the range of 3:1 to 1:1. It is important to note, however, that the electrolyte system of this invention must contain a substantial amount of the potassium dihydrogen phosphate. Electrolyte systems employing only melts of sodium or lithium dihydrogen phosphate do not possess the necessary physical characteristics required of a satisfactory electrolyte, e.g. the buffering properties or temperature range of operation.

The advantage of the electrolyte system described above are many. It has a melting point below about 200° C., which makes it satisfactory for use at the intermediate temperature at which fuel cells employing nonnoble metals operate. It is invariant; that is, it rejects carbon dioxide. It also acts as buffer system, thus tending to minimize concentration polarization. The phosphate electrolyte system is chemically stable. At temperatures of between about 200° and 300°C. no substantial amounts of insoluble high melting, high molecular weight polyphosphates are formed. At these temperatures no volatile dissociation products of phosphorus such as $P_2O_5$ are formed. The phosphate electrolyte system is electrochemically stable; that is, it will not partake in the electrode reaction in an oxidation-reduction manner but will simply act as an ion carrier in an acid-base manner. The phosphate system is roughly analogous to a neutral aqueous medium as opposed to molten alkali metal bisulfates which are strong acid melts, roughly analogous to low pH aqueous electrolytes.

The ability of the melt to act both as an anodic and cathodic buffer medium would not be expected on the basis of the buffering properties in aqueous solutions of primary phosphate salts such as ($KH_2PO_4$). An aqueous solution of $KH_2PO_4$ results from titrating a phosphoric acid solution with potassium hydroxide to its first end point. This is a region of minimum buffering capacity. The existence of ions in the phosphate melt is a sufficient condition for conductance but not for buffering ability. Apparently there exists in the melt acidic and basic ionic components in sufficient quantity and having adequate mobility to confer buffer capacity to the melt. These components of the melt are not $H_2PO_4^{11}$ but higher molecular weight anionic acids in differing states of ionization. For this reason the electrolyte system is described as a melt of its starting components and not in terms of the end compounds. Although the electrical conductance of the electrolyte of this invention is not as large as strong acids, it is sufficient for fuel cell operation. The other advantages pointed out above more than compensate for any loss in electrolytic conductivity.

It is unusual that electrolytes derived from the alkali metal salt dihydrogen phosphate system described above possesses the unique properties required for electrolyte service at intermediate temperatures (200° to 300° C.). The more closely related compounds, such as the alkaline earth metal dihydrogen phosphates, or the monobasic phosphates, such as dipotassium hydrogen phosphate, have melting points too high for the fuel cell service at these temperatures.

In the operation of a fuel cell employing the alkali metal dihydrogen phosphate melt electrolyte of this invention, electrodes containing nonnoble or noble metal catalysts are simply inserted into the phosphate system. The only limitation on the materials making up the electrode is that they be stable at temperatures of 200° to 300° C. Otherwise, no special construction of the electrode is required. The cell container must, of course, be stable under these conditions and may in addition include heating elements which will maintain the cell at its required operating temperature. It is noteworthy that cell polarization which normally occurs in cell operation may be used as a heat source by which the electrolyte may be maintained in a molten state. This provides for a convenient use of otherwise wasted energy. In effect, the electrodes of the cell could be used as resistive heaters to bring the cell on temperature.

Fuel and oxidant are fed to the anode and cathode respectively, as per the usual manner in fuel cells. In general, the preferred fuels are the hydrogen containing fuels, i.e.

hydrogen and organic compounds containing hydrogen in their molecular structure, e.g. $C_1$–$C_{12}$ hydrocarbons and oxygen substituted hydrocarbons. Especially preferred fuels include $C_1$ to $C_5$ alcohols, $C_2$ to $C_5$ alkanes and olefins, $C_2$ to $C_3$ glycols and hydrogen. The oxidant may be oxygen or air.

The electrical energy produced by this cell is drawn off as per the usual manner via an external circuit.

The electrolytes of this invention are primarily designed to operate in fuel cells containing nonnoble metal catalysts, e.g. nickel, Raney nickel cobalt alloys, etc., but they may also be employed in fuel cells employing noble metal catalysts, such as platinum, palladium, gold, silver, etc., to upgrade the performance of such cells.

A binary melt most frequently used as an electrolyte is one having as its initial components, 25 wt. % $NaH_2PO_4 \cdot H_2O$ and 75 wt.% $KH_2PO_4$. This mixture is prepared by heating the initial components until a clear colorless liquid is obtained. Repeated trials have shown that by this simple procedure, a low melting phosphate salt can be reproducibly prepared. The initial mixture undergoes about a 7 percent weight loss on heating. This is due to the loss of water of hydration and by condensation reactions to form higher phosphates. If the potassium dihydrogen phosphate is to be employed singly, it is heated in the same manner as the binary mixture described above. The phosphate melts are added to the cell either in molten form or in the solid state after the melt has been made.

The properties of the molten electrolyte of this invention, such as alkalinity, conductance, etc., can be varied by addition of suitable reagents, such as oxides, fluorides, carbonates, etc. Reagents such as $ZnO$, $CsF$ and $Cs_2CO_3$ lower viscosity, thereby increasing conductance and also impart increased alkalinity to the electrolyte melt.

DESCRIPTION OF THE PREFERRED EMBODIMENTS

The following examples are to be construed as merely representative of this invention, and they are in no way to be construed as limiting the scope of this discovery.

Example I

A fuel cell was tested which employed butane as the fuel, oxygen as the oxidant and sintered polytetrafluoroethylene impregnated with a platinum catalyst as an electrode. A phosphate electrolyte consisting of 75 wt.% $KH_2PO_4$ and 25 wt.% $NaH_2PO_4 \cdot H_2O$ was prepared by physically mixing the constituents. This mixture had a melting point below 200° C.

The butane was prehumidified with water at 80° C. by sparging it into a water reservoir maintained at 80° C. This small amount of water, which becomes part of the reactant feed, is necessary as the molten electrolyte has a low $H_2O$ content. As water discharge is rate determining in the anodic oxidation of hydrocarbons, this must be supplied. From stoichiometric considerations water is also the major source of oxygen for the production of $CO_2$ at the anode. The cell was then operated at a temperature of 250° C. at several current densities and the polarization of the anode and cathode from their theoretical open circuit potentials was measured. The results are shown in table I below.

TABLE I
Butane and Oxygen Performance On Sintered Platinum-Teflon Electrodes at 250° C.

| Current density ma/cm² | Polarization, volts from theoretical butane | Polarization, volts from theoretical oxygen |
|---|---|---|
| 0 | 0.13 | 0.08 |
| 5 | 0.22 | 0.11 |
| 10 | 0.23 | 0.13 |
| 50 | 0.27 | 0.17 |
| 100 | 0.30 | 0.18 |
| 200 | 0.35 | 0.19 |

These polarization data indicate a loss of potential during current flow. These data compare favorably with fuel cells employing art-known electrolytes such as sulfuric acid and indicates that an alkali metal dihydrogen phosphate melt electrolyte system possesses the electrical conductance required for fuel cell use.

Example II

A fuel cell was tested which employed butane as a fuel, oxygen as an oxidant and an electrode consisting of a catalyst of 25 atom percent cobalt and 75 atom percent Raney nickel supported as tantalum. The electrolyte was the same as that used in Example I. The butane fuel was prehumidified with water at 80° C. The cell was then operated at a temperature of 250° C. at several current densities. The polarization at the anode is shown in table II below.

TABLE II

| Current Density ma./cm.² | Polarization, Volts From Theoretical Butane Anode |
|---|---|
| 0 | 0.08 |
| 1 | 0.14 |
| 2 | 0.26 |
| 3 | 0.38 |
| 4 | 0.54 |
| 5 | 0.67 |

Thus, a hydrocarbon can be oxidized with a nonnoble metal catalyst in the melt electrolyte of this invention. It was also noted that the electrolyte of this example did not produce appreciable corrosion of the electrodes or other fuel cell elements, as would conventional electrolytes.

What is claimed is:

1. A fuel cell comprising a melt electrolyte formed by melting, at a melting temperature of between about 200° and about 300° C., a mixture of potassium dihydrogen phosphate and an acid phosphate selected from the group consisting of lithium dihydrogen phosphate, sodium dihydrogen phosphate and mixtures of the two, wherein the weight ratio of the potassium dihydrogen phosphate to the other acid phosphate composition is in the range of between about 3:1 and about 1:1.

2. A fuel cell as defined in claim 1 wherein said mixture is potassium dihydrogen phosphate and sodium dihydrogen phosphate.

3. A fuel cell as defined in claim 2 wherein the weight ratio of the potassium dihydrogen phosphate to the sodium dihydrogen phosphate is about 3:1.